Jan. 13, 1931.  E. F. GOODYEAR ET AL  1,788,431
DISK WHEEL
Filed Jan. 4, 1930

Inventors
ERNEST FREDERICK GOODYEAR.
JOSEPH WRIGHT.
By Their Attorneys

Patented Jan. 13, 1931

1,788,431

UNITED STATES PATENT OFFICE

ERNEST FREDERICK GOODYEAR AND JOSEPH WRIGHT, OF FOLESHILL, COVENTRY, ENGLAND, ASSIGNORS TO DUNLOP RUBBER COMPANY LIMITED, OF BIRMINGHAM, ENGLAND, A CORPORATION OF GREAT BRITAIN

DISK WHEEL

Application filed January 4, 1930, Serial No. 418,448, and in Great Britain February 4, 1929.

This invention relates to wheels of the kind in which the wheel comprises two disks supporting an annular rim and is of particular application to the wheels of aircraft, where it is desirable, in the heavier machines especially, to provide for additional strength at the junctions of the disks and rim.

Such a reinforcement has up to the present involved a number of operations upon not only the rim itself but also the disks of the wheel in order to shape these constituent parts to the required configuration for assembly together.

It is one of the objects of this invention to simplify these operations by confining the shaping to one particular part, thereby greatly reducing, if not entirely eliminating, the number and difficulty of the shaping operations previously necessary on several parts.

Another object of this invention is to provide a rim reinforcement which not only contributes rigidity to the rim and disks but also relieves the rivets, welds or other securing means of the shearing stresses which otherwise tend to fall thereon when landing or when passing over an uneven surface.

Another object of this invention is to provide a reinforcing element which by its inclusion not only reduces the number of operations upon the disks and rim to be used therewith and also consequent expense, but is additionally shaped to form a seating for the tyre beads.

Another object of this invention is the provision of a reinforcing member which shall preserve a streamline junction between the rim and the disk or between the rim and the tyre or at both these places by rendering unnecessary any change of curvature where the side disks join the rim.

According to this invention, we provide a wheel comprising a rim and load carrying disks spaced thereby in conjunction with annular reinforcing members in which the edges of the disks and rim terminate in flat superposed assembly against one or more corresponding faces externally recessed upon the annular reinforcing members, the inward facing surfaces of which are shaped to form a seating for the tyre beads or walls, and which may be further characterized by a peripheral shoulder continued outwardly to overlap the outer side of the outer disk.

The disk may be formed to engage with one or more steps or grooves in the reinforcing members, the parts being secured together by suitable means such as rivets. The reinforcing members may conveniently be formed by extrusion, and the rim may be suitable for beaded edge, wired on, or other tyres.

In order that our invention may be more easily understood and readily carried into effect the same will now be described with reference to the following drawings, consisting of three figures showing the combination of disks, rim and reinforcing members in cross section.

Figure 1:
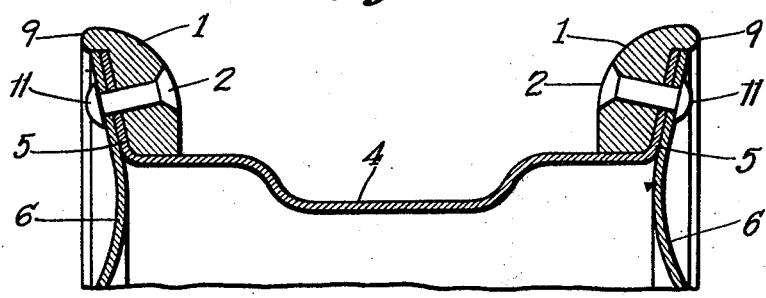
Figs. 1 and 3 show forms of the invention embodying well base rims.
Figure 2:
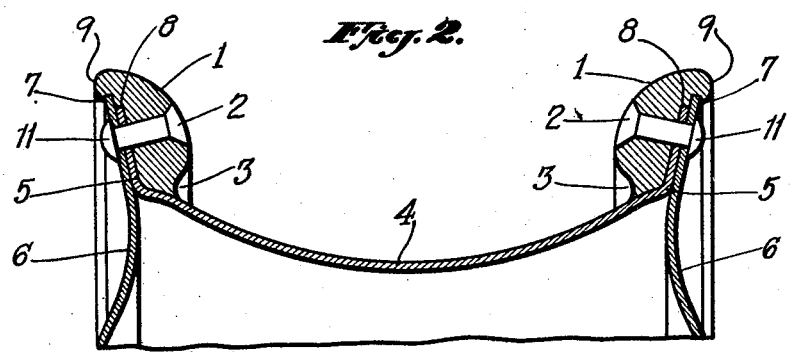
Fig. 2 shows the invention including a rim for beaded edge tyres.

The reinforcing members 1 are formed with a tyre supporting profile 2 which may be adapted for beaded edge tyres by the formation shown in Fig. 2 at 3, the cavity being hollowed sufficiently to house the beads.

The rim 4 is shaped on each side to contact the recessed face 5, the load supporting disks 6 being superposed thereon.

Figure 3:
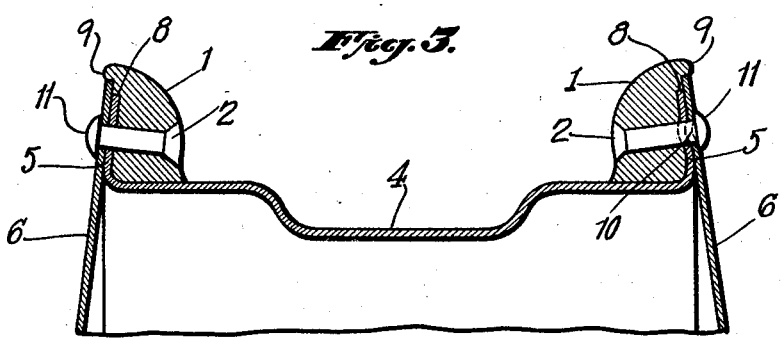

In Figs. 2 and 3 the rim 4 and disk 6 are shown positioned in stepped recesses at 8 giving a stronger shoulder, and in Fig. 2 the shoulders 9 are brought over to overlap the outer surface of the outer disks at 7.

In the streamline form illustrated in Fig. 3 the disks and reinforcing members on one side are shown formed with complementary grooves at 10, the members being conveniently secured by rivets 11. Clamping rings may be externally applied where found to be necessary.

The modifications shown in the various embodiments are interchangeable and the invention is to be understood as only limited in scope by the appended claims.

While we have described quite specifically the embodiments of the invention herein illustrated it is not to be construed that we are limited thereto since various modifications may be made without departing from the invention as defined in the appended claims.

What we claim is:

1. A vehicle wheel comprising a rim, load carrying disks spaced apart by said rim, annular reinforcing members having recessed seats on their outer faces, said rim having flanged portions engaging the recessed seats of the reinforcing members and disks whose peripheral margins abut said flanges and are secured to said reinforcing members.

2. A vehicle wheel comprising a rim, load carrying disks spaced apart thereby, annular reinforcing members having stepped seats formed therein, said rim having a flange engaging one of said stepped seats, the outer peripheral edge of said disk engaging another of said seats and means securing said reinforcing member, said flange and said disk to one another.

In witness whereof, we have hereunto signed our names.

ERNEST FREDERICK GOODYEAR.
JOSEPH WRIGHT.